United States Patent
Collado et al.

(10) Patent No.: US 12,371,158 B2
(45) Date of Patent: Jul. 29, 2025

(54) AFT SWEPT SPRING MAIN LANDING GEAR

(71) Applicant: Textron eAviation Inc., Wichita, KS (US)

(72) Inventors: Paul C. Collado, Wichita, KS (US); Tatiana Arends, Goddard, KS (US); Sean Michael Killingsworth, Wichita, KS (US); Justin Birkey, Wichita, KS (US); Steven G. Hagerott, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 0 days.

(21) Appl. No.: 18/426,956

(22) Filed: Jan. 30, 2024

(65) Prior Publication Data

US 2024/0253775 A1 Aug. 1, 2024

Related U.S. Application Data

(60) Provisional application No. 63/482,170, filed on Jan. 30, 2023.

(51) Int. Cl.
*B64C 25/52* (2006.01)
*B64C 25/32* (2006.01)

(52) U.S. Cl.
CPC ........ *B64C 25/52* (2013.01); *B64C 2025/325* (2013.01)

(58) Field of Classification Search
CPC .... B64C 25/52; B64C 2025/325; B64C 25/36
See application file for complete search history.

(56) References Cited

U.S. PATENT DOCUMENTS

| | | | |
|---|---|---|---|
| 8,490,919 B2 | 7/2013 | Nannoni et al. | |
| 9,796,468 B2 | 10/2017 | Thompson | |
| 11,214,360 B2 | 1/2022 | Isaac et al. | |
| 11,279,473 B2 | 3/2022 | Mombrinie | |
| 2010/0308156 A1* | 12/2010 | Landry | B64C 25/52 29/525.01 |
| 2016/0052625 A1* | 2/2016 | Losi | F16F 7/122 244/108 |
| 2017/0113797 A1* | 4/2017 | Hogan | B64C 37/00 |
| 2019/0176976 A1* | 6/2019 | Duval | B64C 25/52 |

\* cited by examiner

*Primary Examiner* — Ashesh Dangol
(74) *Attorney, Agent, or Firm* — Avek IP, LLC

(57) ABSTRACT

A landing gear system for an aerial device includes a mounting structure and a main landing gear. The mounting structure is configured to be attached relative to a fuselage of the aerial device. The main landing gear includes a pair of aft swept struts and wheels mounted on each of the aft swept struts. The pair of aft swept struts is attached relative to the mounting structure and extends downwardly and rearwardly relative thereto.

18 Claims, 5 Drawing Sheets

AFT SWEPT SPRING MAIN LANDING GEAR

CROSS-REFERENCE TO RELATED APPLICATIONS

This application claims the benefit of priority of U.S. Provisional Patent Application No. 63/482,170, filed on Jan. 30, 2023, the disclosure of which is herein incorporated by reference in its entirety.

BACKGROUND OF THE INVENTION

1. Field

The disclosed embodiments relate generally to the field of aircraft structures. More specifically, the disclosed embodiments relate to main landing gear configurations, structural arrangements, and assembly in Vertical Takeoff and Landing (VTOL) aircraft.

2. Description of the Related Art

Numerous landing gear arrangements for aircraft are known. For example, U.S. Pat. No. 8,490,919 to Nannoni et al. describes a landing gear for a helicopter that can switch between landing on wheels and skids. U.S. Pat. No. 9,796,468 to Thompson describes a landing gear that uses a sprung arm to absorb landing forces and prevent rotation of landing gear assemblies. U.S. Pat. No. 11,214,360 to Isaac et al. describes a landing gear that can be adjusted based on if the aircraft is making a traditional landing or if the aircraft is making a VTOL landing. U.S. Pat. No. 11,279,473 to Mombrinie describes an STOL aircraft concept. The STOL concept includes depictions of landing gear with aft cant angles. The rear landing gear is described in Mombrinie as a linear strut with a wheel at the end that can rotate around a pivot joint.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, a landing gear system for an aerial device broadly includes a mounting structure and a main landing gear. The mounting structure is configured to be attached relative to a fuselage of the aerial device. The main landing gear includes a pair of aft swept struts and wheels mounted on each of the aft swept struts. The pair of aft swept struts is attached relative to the mounting structure and extends downwardly and rearwardly relative thereto. The main landing gear further includes a center section attached relative to and extending between the pair of aft swept struts.

In another embodiment, a landing gear system for an aerial device broadly includes a pair of trunnion mounts and a main landing gear. The trunnion mounts are positioned on opposite sides of a longitudinal landing gear axis and configured to be pivotally attached relative to a fuselage of the aerial device. The main landing gear includes a pair of aft swept struts and wheels mounted on each of the aft swept struts. Each of the pair of aft swept struts is attached to a respective one of the pair of trunnion mounts and extends downwardly and rearwardly relative thereto, with each aft swept strut and corresponding wheel being pivotal with the one respective trunnion mount.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
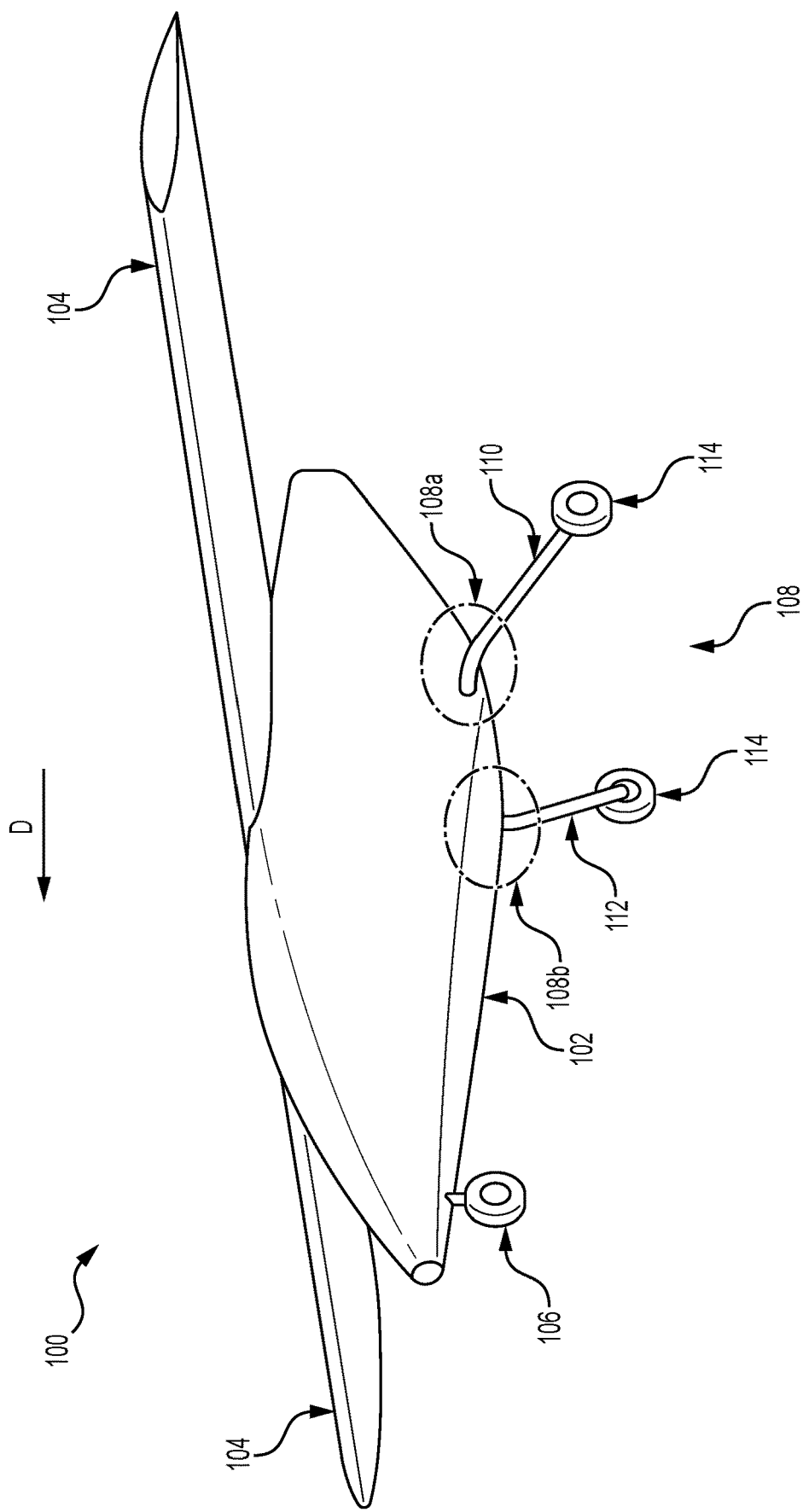
FIG. 1 is a fragmentary front perspective view of a VTOL aircraft including a fuselage, wing, and an embodiment of an aft swept spring main landing gear system, with covering components of the aft swept spring main landing gear system being removed.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the technology can include a variety of combinations and/or integrations of the embodiments described herein.

Embodiments provide an aft swept spring main landing gear system, and a method of assembling the system. FIG. 1 shows a perspective view of an embodiment showing incorporation of the disclosed embodiments into a VTOL aircraft 100. Embodiments of the aft swept spring main landing gear of VTOL aircraft 100 may provide the main landing gear with a reliable and measurable spring configuration. The disclosed spring arrangement may also permit vertical loads to be absorbed during vertical landing and during ground maneuvers while reducing exposure of the airframe structure to lateral scrubbing forces found in conventional main landing gear spring strut configurations. For instance, main landing gear embodiments may have a rearwardly swept arm structure that deflects rearwardly to reduce outboard deflection of the main landing gear and increase aft strut deflection to roll the landing gear wheel. In particular, by facilitating aft rolling of the landing gear wheel, the aft rolling of the wheel may reduce lateral tire scrub. As a result, aspects of the disclosure serve to reduce outboard tire scrubbing forces associated with vertical landing of an aerial device, such as an aircraft (e.g., the VTOL aircraft 100, a helicopter, a drone aircraft, or other aircraft configured for vertical landing).

Figure 2:
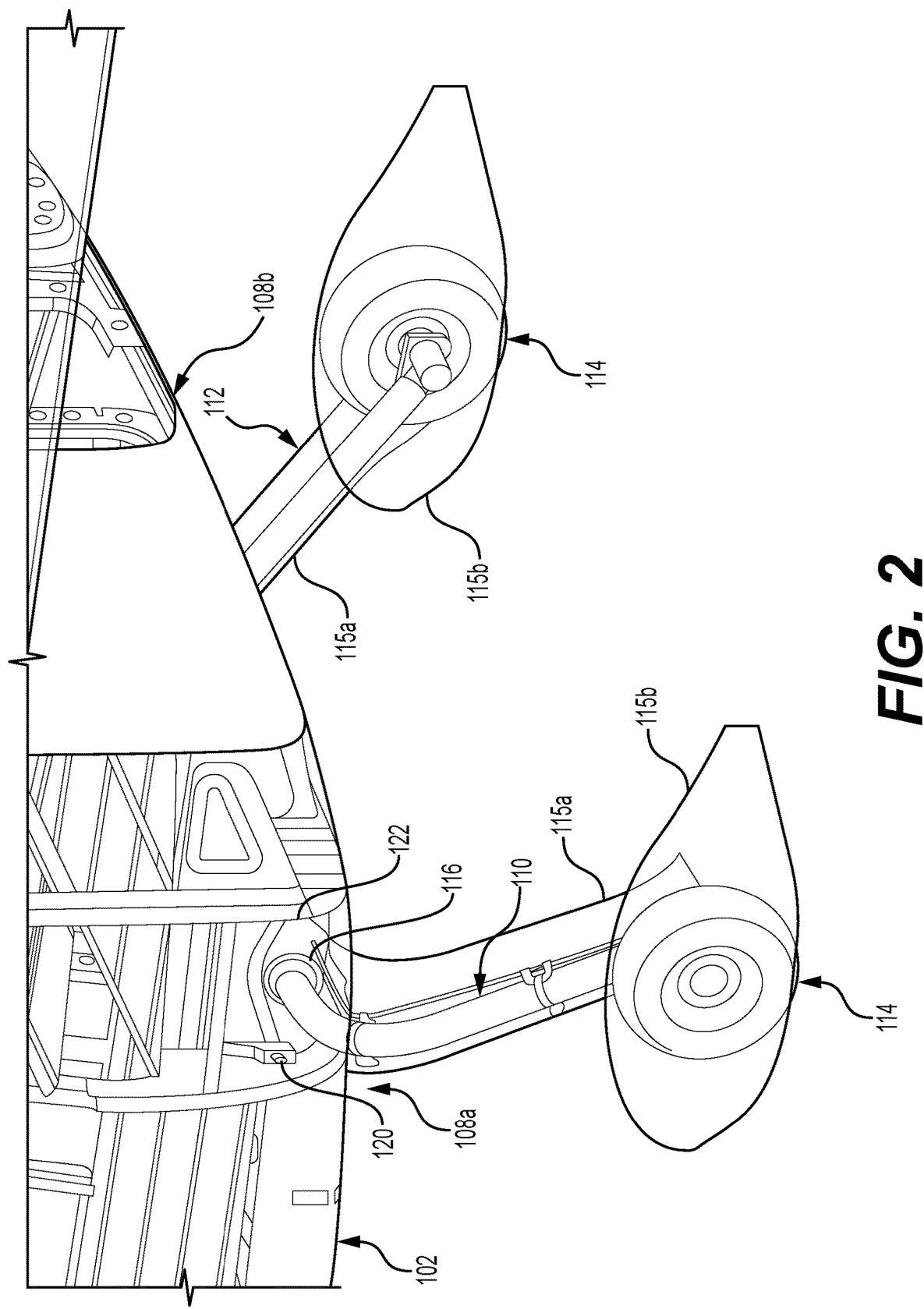
FIG. 2 is a fragmentary side perspective view of the VTOL aircraft shown in FIG. 1, depicting an interface between the aft swept spring main landing gear and the fuselage, with covering components of the aft swept spring main landing gear system being shown schematically.

Referring to FIGS. 1 and 2, embodiments of VTOL aircraft 100 may include a center fuselage 102 mounted underneath a laterally extending wing 104. Center fuselage 102 may define a longitudinal fuselage axis associated with a forward direction D of flight. One or more engines (not shown), which may be used to drive one or more propellers (not shown), may be operably supported relative to the center fuselage 102 and wing 104 to provide aircraft propulsion. It is within the scope of the disclosure for embodiments of the aircraft to have an alternative fuselage and/or an alternative wing structure. For example, one or more aircraft embodiments may have a relatively lower wing configuration where at least part of the fuselage extends above the wing.

A nose landing gear 106 is mounted underneath the fuselage 102. VTOL aircraft 100 may further include an aft swept spring main landing gear 108 mounted to extend underneath the fuselage 102 and located rearwardly of the nose landing gear 106. Embodiments of the aircraft may include an alternative nose landing gear. As used herein to describe the main landing gear and the struts, the terms "aft swept" and "rear swept" refer to struts that comprise "trailing" arms, which may extend downwardly and rearwardly relative to the fuselage.

The aft swept spring main landing gear 108 may be mounted to the center fuselage 102 and extend underneath center fuselage 102. The main landing gear 108 may include a pair of downwardly and rearwardly angled main landing gear struts 110 and 112, along with main landing gear wheels 114 rotatably mounted adjacent to lowermost ends of the struts 110 and 112. The aft swept spring main landing gear 108 may have a longitudinal landing gear axis A1 (see FIG. 3) that extends parallel to the longitudinal fuselage axis. Interfaces 108a and 108b support main landing gear struts 110 and 112 respectively where they meet the fuselage 102. More details regarding interface 108a are disclosed in FIG. 2. It is also within the scope of the disclosure for an aft swept spring main landing gear to be mounted to structure other than the center fuselage. For an aircraft having a low wing configuration, the main landing gear may be mounted to the wing or to both the wing and the fuselage.

FIG. 2 additionally shows the pair of aft swept and downwardly and outwardly angled struts 110 and 112, a main landing gear trunnion mount 116, and the main landing gear wheels 114. Strut covers 115a and wheel covers 115b, depicted schematically in FIG. 2, may be secured to cover the struts 110 and 112 and main landing gear wheels 114. Trunnion mount 116 may be configured to be mounted to the fuselage 102 structure at relatively forward and rearward fuselage frame members 120 and 122, respectively. Another trunnion mount 118 (see FIG. 3) may also be configured for mounting to the fuselage 102 at fuselage frame members (not shown), which are similar to frame members 120 and 122. Trunnion mounts 116 and 118 comprise a mounting structure that may be attached relative to the fuselage 102. Trunnion mounts 116 and 118 may secure and permit flexing movement of the struts 110 and 112 relative to the fuselage 102. In particular, the pair of aft swept struts 110 and 112 may be attached relative to the mounting structure provided by trunnion mounts 116 and 118 to extend downwardly and rearwardly relative thereto. The aft fuselage frame member 122 may include a depending bracket 122a (see FIG. 4) that presents an aft longitudinal bore 122b configured to receive part of the trunnion mount 116. Similarly, forward fuselage frame member 120 may include a depending bracket 120a (see FIG. 4) that presents a forward longitudinal bore (not shown) positioned coaxially relative to the aft longitudinal bore 122b.

Figure 3:
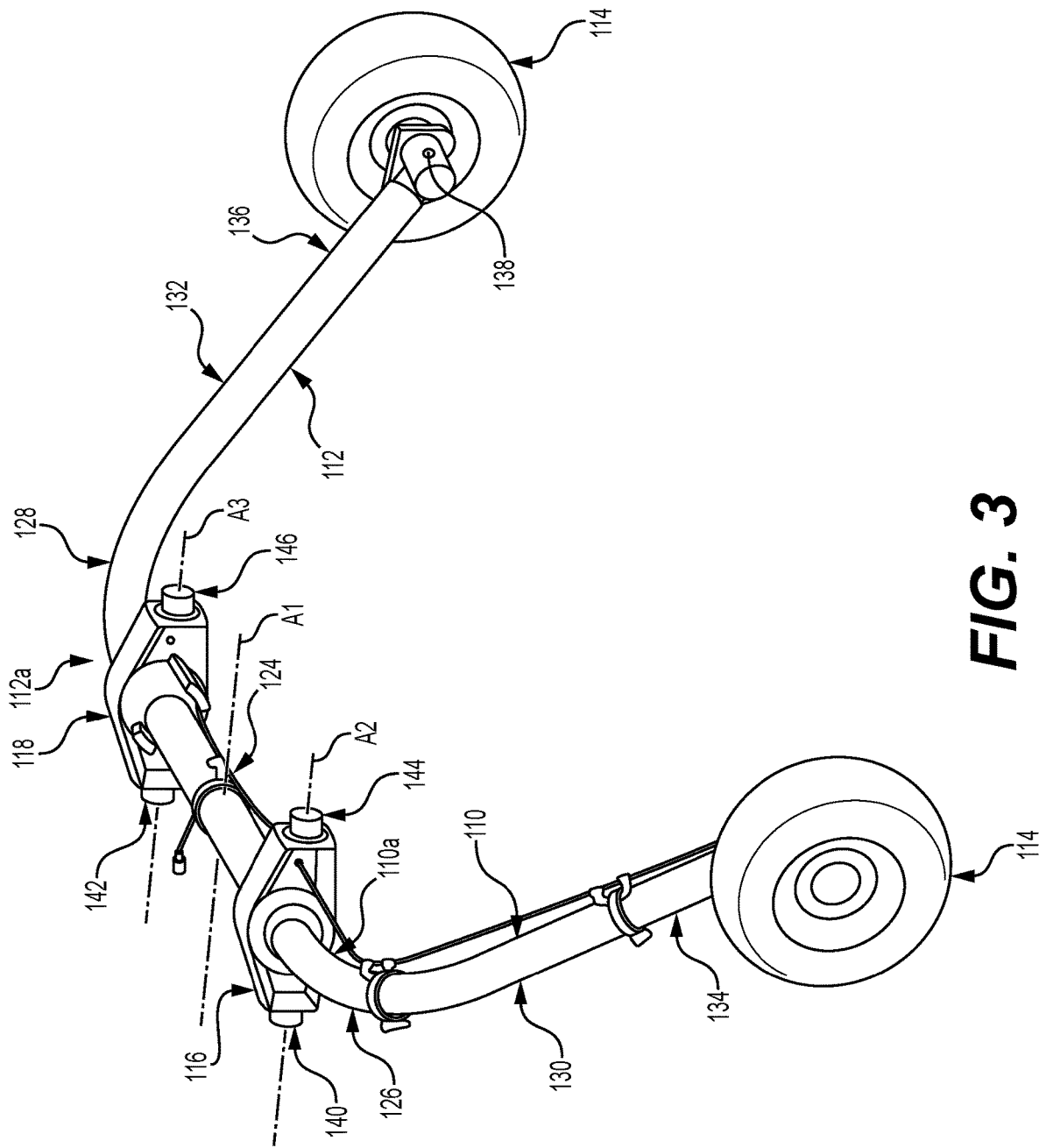
FIG. 3 is a fragmentary side perspective view of the aft swept spring main landing gear similar to FIG. 2, but with the fuselage being removed from the aft swept spring main landing gear to depict main landing gear struts, main landing gear wheels, a pair of trunnion mounts, and a center main landing gear tube of the aft swept spring main landing gear.
Figure 5:
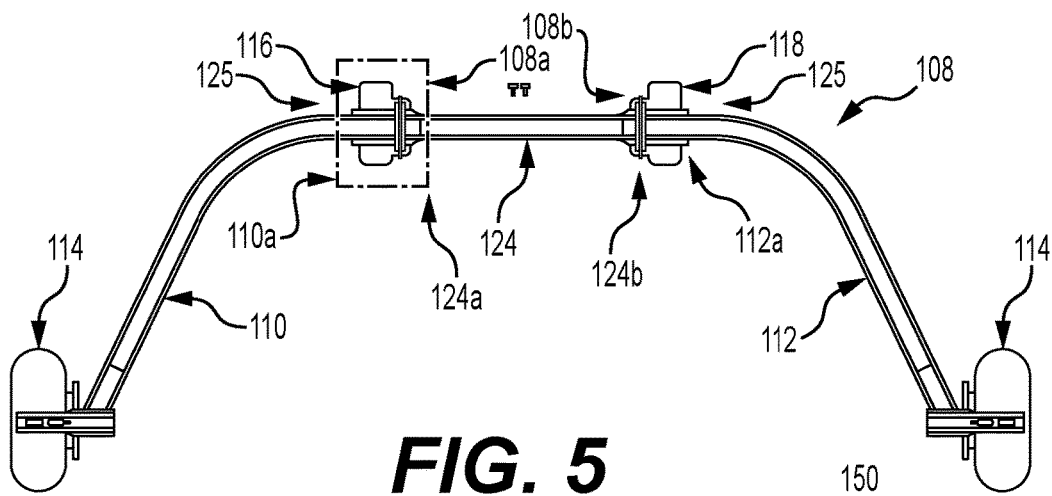
FIG. 5 is a cross section view of the aft swept spring main landing gear system.
Figure 5A:
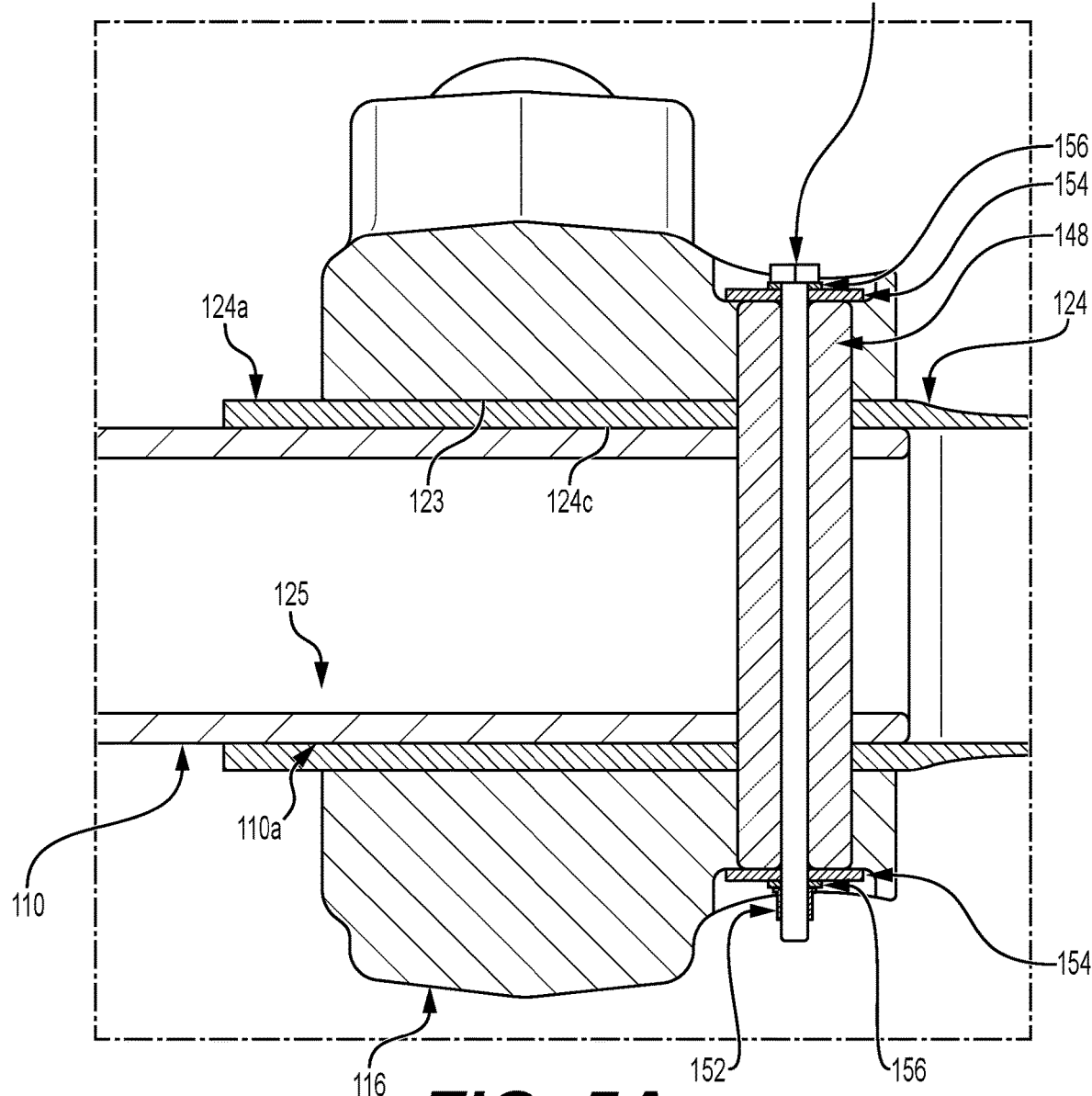
FIG. 5A is an enlarged detail section view of the main landing gear tubes and trunnion mount shown in FIG. 5.

Referring to FIGS. 3, 5, and 5A, trunnion mounts 116 and 118 may each present a transverse bore 123 (see FIG. 5A). Trunnion mounts 116 and 118 may be positioned side-by-side so that the transverse bores 123 may be arranged coaxial relative to one another. The transverse bores 123 of trunnion mounts 116 and 118 may at least partly receive main landing gear struts 110 and 112, respectively. Main landing gear 108 may further include a center main landing gear tube 124 with opposite outboard margins 124a and 124b (see FIG. 5). Center main landing gear tube 124 may also be received by trunnion mounts 116 and 118 through the transverse bore 123 (see FIG. 5A). In particular, outboard margins 124a and 124b of the center main landing gear tube 124 may be positioned in engagement with the transverse bores 123 of respective trunnion mounts 116 and 118. Trunnion mounts 116 and 118 may secure and permit flexing movement of the center main landing gear tube 124 relative to the fuselage 102. The outboard margins 124a and 124b of the center main landing gear tube 124 may present lateral tube bores 124c (see FIG. 5A). End margins 110a and 112a of struts 110 and 112 may be inserted into lateral tube bores 124c of respective outboard margins 124a and 124b of center main landing gear tube 124 for engagement with the respective outboard margins 124a and 124b to form overlapping tubular joints 125 (see FIG. 5A). As a result, the center main landing gear tube may be attached relative to and extend between the pair of aft swept struts 110 and 112.

Each main landing gear strut 110 and 112 may be comprised of three tubular sections—bent sections 126 and 128, straight center sections 130 and 132, and straight end sections 134 and 136. Straight end sections 134 and 136 are arranged to receive a knuckle 138 (see FIG. 3). Struts 110 and 112 may also have end margins 110a and 112a, respectively. The end margins 110a and 112a of struts 110 and 112 may extend at least partly into transverse bores 123 of trunnion mounts 116 and 118 (see FIG. 5A). End margins 110a and 112a of struts 110 and 112 may be engaged with and received by, respectively, outboard margins 124a and 124b of the center main landing gear tube 124. Tubular sections of the struts 110 and 112 may have a generally circular cross-sectional profile (not shown). Although the struts 110 and 112 may have the depicted tubular construction, alternative struts may have one or more different tubular sections. For instance, one or more sections of the struts may have an alternatively shaped cross-sectional profile (such as an oval shape, a square shape, a rectangular shape, etc.).

Center main landing gear tube 124 and struts 110 and 112 may include metallic material (such as stainless steel, alloy steel, etc.), a non-metallic composite material (such as a composite including carbon fiber and an epoxy material), a synthetic resin material, and/or other materials suitable for forming elements of the landing gear. For example, embodiments of the center main landing gear tube and struts may include an AISI 4340 alloy steel (or a derivative of 4340), an AISI 6150 alloy steel (or a derivative of 6150), or another alloy steel. Embodiments of the center main landing gear tube and struts may include a CUSTOM 465® stainless steel (also referred to as UNS S46500).

Although the depicted aft swept spring main landing gear 108 may include the center main landing gear tube 124, certain aspects of the disclosure may contemplate the construction of a main landing gear having opposed struts but without a center structure to interconnect the struts. In such an embodiment, the struts of the main landing gear may have end margins rigidly fixed relative to the fuselage, with the main landing gear being devoid of structure extending between the end margins of the struts.

Figure 4:
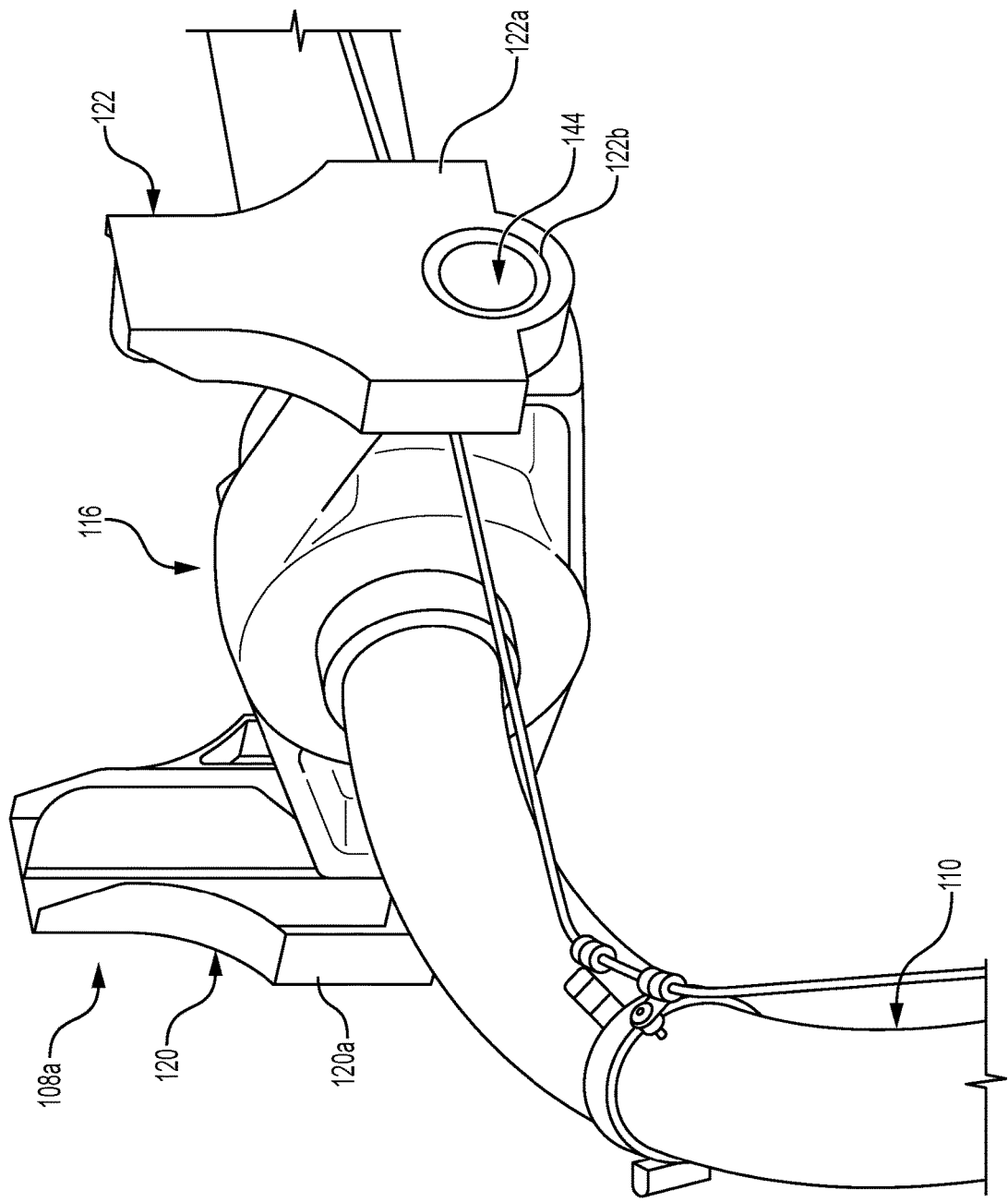
FIG. 4 is an enlarged fragmentary side perspective view of the VTOL aircraft shown in FIGS. 1 and 2, depicting one of the trunnion mounts pivotally supported by a forward fuselage frame member and an aft fuselage frame member.

FIG. 3 also shows trunnion mounts 116 and 118 each having forwardly protruding bosses 140 and 142, and rearward protruding bosses 144 and 146 which provide a method of mounting trunnion mounts 116 and 118 to the airframe, as is further disclosed in FIG. 4.

FIG. 4 further reveals the interface 108a between trunnion mount 116, forward fuselage frame member 120, and aft fuselage frame member 122. Trunnion mount 116 may have longitudinally protruding bosses 140 (not shown in FIG. 4) and 144, as previously disclosed in FIG. 3. Boss 144 may be received by and journaled within the aft longitudinal bore 122b of the aft fuselage frame member 122. Similarly, boss 140 may be received by and journaled within the forward longitudinal bore (not shown) of the forward fuselage frame member 120. Thus, trunnion mount 116 may be pivotally supported by forward and aft fuselage frame members 120 and 122 to pivot about a longitudinal mount pivot axis A2 (see FIG. 3) defined by bosses 140 and 144 and associated with the interface 108a.

Similarly, the trunnion mount 118 associated with interface 108b may have longitudinally protruding bosses 142 and 146 (see FIG. 3). Bosses 142 and 146 may be received by and journaled within forward and aft fuselage frame members (not shown) similar to forward and aft fuselage frame members 120 and 122. In this manner, trunnion mount 118 may also be pivotally supported to pivot about a longitudinal mount pivot axis A3 (see FIG. 3) defined by bosses 142 and 146 and associated with the interface 108b. The mount pivot axis A2 of interface 108a and the mount pivot axis A3 of interface 108b may be arranged parallel to one another (see FIG. 3).

Forward and aft fuselage frame members (including frame members 120 and 122), along with trunnion mounts 116 and 118, may include a relatively rigid material, such as a metallic material (e.g., aluminum, stainless steel, alloy steel, etc.) and/or a synthetic resin material, to rigidly engage and secure the center main landing gear tube 124 and struts 110 and 112. Alternative embodiments of the frame members and/or trunnion mounts may include elements having a relatively flexible material to permit shifting of the trunnion mounts relative to the fuselage. For instance, trunnion mounts may include an elastomeric element that engages the center main landing gear tube and/or struts. The elastomeric element may provide energy absorption or damping. Elastomeric element may also permit flexing movement of the center main landing gear tube and/or struts relative to the fuselage.

It is within the scope of at least certain aspects of the disclosure for the main landing gear struts and/or the center main landing gear tube to be alternatively supported for flexing movement relative to the fuselage. In certain embodiments, the trunnion mounts and/or frame members may be alternatively configured to permit flexing of the main landing gear struts and the center main landing gear tube. For example, the trunnion mounts and frame members may utilize a bearing mechanism other than a journal bearing (such as a roller bearing, ball bearing, etc.).

Alternative embodiments may also utilize a support structure other than a trunnion to support the center main landing gear tube and/or struts. For instance, embodiments of the disclosure may include a flexible bracket or other flexible frame element (e.g., formed of an elastomeric material or another flexible material) devoid of a pivotal bearing joint that permits movement of the center main landing gear tube and/or struts relative to the fuselage.

FIG. 5A shows a detail section view of the interface 108a of trunnion mount 116, main landing gear strut 110, and center main landing gear strut tube 124 and how all are interconnected. FIG. 5A further shows a cross pin 148, which may secure the trunnion mount 116, the landing gear strut 110, and center main landing gear strut tube 124 relative to each other. Cross pin 148 may extend orthogonally to the transverse bore 123 of the trunnion mount 116 and removably received by the trunnion mount 116. Cross pin 148 may further extend through the landing gear strut 110 and center main landing gear strut tube 124. For example, cross pin 148 may extend orthogonally to the lateral tube bore 124c of center main landing gear strut tube 124. Cross pin 148 may be secured by a bolt 150, nut 152, large flat washers 154 and small flat washers 156.

Oppositely symmetrical mounting interfaces 108a and 108b may exist on either side of the VTOL aircraft 100. Interfaces 108a and 108b each support landing gear struts 110, and 112 respectively. The specifics for interface 108a are shown in FIGS. 4, 5, and 5A. The structures at interface 108b may exist in lateral symmetry relative to interface 108a.

Thus, the arrangements at interfaces 108a and 108b shown in FIGS. 1 and 2 create a cantilevered beam configuration in which struts 110 and 112 are subjected to bending loads in the mostly vertical direction and torsion loads when the aircraft lands vertically and when the aircraft is on the ground. The vertical bending loads are reacted against by cross pin 148 shown in FIG. 5A, while the torsion loads are reacted against by the center main landing gear tube 124. In this configuration, the aft swept spring main landing gear acts as a spring in both bending and torsion as can be described by Hooke's law $F=kx$ where Force F is equal to spring constant k multiplied by displacement x. Spring constant k and displacement x can be described in both linear units (mm, inch, etc.) and torsion units (degrees, radians, etc.).

The loading conditions of the aft swept spring main landing gear results in both a reliable and measurable spring configuration in which vertical loads can be absorbed during vertical landing and ground maneuvers without subjecting the airframe structure to lateral tire scrubbing forces found in conventional main landing gear spring strut configurations. As noted above, the aft swept landing gear construction enables aft rolling of the landing gear wheel while reducing lateral tire scrub.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A landing gear system for an aerial device, the landing gear system comprising:
   a mounting structure configured to be attached to the aerial device; and
   a main landing gear including a pair of aft swept struts and a pair of wheels, wherein said pair of aft swept struts comprises a first aft swept strut and a second aft swept strut, and wherein the pair of wheels comprises a first wheel mounted on the first aft swept strut and a second wheel mounted on the second aft swept strut,
   said pair of aft swept struts being attached to the mounting structure and extending downwardly and rearwardly,
   said main landing gear further including an independent center section removably connected to and extending between the pair of aft swept struts,
   the mounting structure further comprising a first trunnion mount and a second trunnion mount, the first trunnion mount being positioned on an opposite side of a longitudinal landing gear axis than the second trunnion mount,
   the independent center section including ends received into each of the first and second trunnion mounts, the first and second trunnion mounts configured to pivot as the independent center section flexes; and
   the first and second aft swept struts being attached to the first and second trunnion mounts respectively and extend downwardly and rearwardly, with each of the first and second aft swept struts and corresponding first and second wheels being pivotal relative to the first and second trunnion mounts, respectively.

2. The landing gear system of claim 1, wherein the center section acts as a spring that flexes to permit pivoting of the first wheel and the first aft swept strut relative to the second wheel and the second aft swept strut about the longitudinal landing gear axis.

3. The landing gear system of claim 2, wherein each of the first and second aft swept struts acts as a spring that flexes to permit shifting of the first wheel and the second wheel relative to the mounting structure about a lateral landing gear axis transverse to the longitudinal landing gear axis.

4. The landing gear system of claim 1, wherein the first and second trunnion mounts each include a forward protruding boss and a rearward protruding boss configured to pivotally attach the respective trunnion mount to the aerial device, with the bosses of each trunnion mount of the pair of trunnion mounts defining a mount pivot axis and being arranged so that the mount pivot axis of each trunnion mount of the pair of trunnion mounts is parallel to the longitudinal landing gear axis.

5. The landing gear system of claim 4, wherein each of the first and second aft swept struts acts as a spring that flexes to permit shifting of the first wheel and the second wheel relative to the first and second trunnion mounts about a lateral landing gear axis transverse to the mount pivot axis.

6. The landing gear system of claim 5, wherein the first and second trunnion mounts each present a transverse bore, each of the first and second aft swept struts having an end margin secured to a respective trunnion mount and received by a corresponding transverse bore.

7. The landing gear system of claim 6, comprising a pin that extends orthogonally to the transverse bore and secures the end margin of one of the aft swept struts to the respective trunnion mount, said pin restricting movement of the end margin of the one of the aft swept struts relative to the respective trunnion mount.

8. The landing gear system of claim 1, wherein the center section comprises a tubular structure with opposite outboard margins that present a first lateral tube bore and a second lateral tube bore, with the first aft swept strut having an end margin inserted into the first lateral tube bore and the second aft swept strut having an end margin inserted into the second lateral tube bore, thereby providing for engagement with the outboard margins of the tubular structure.

9. The landing gear system of claim 8, wherein the center section acts as a spring that flexes to permit pivoting of the first wheel and the first aft swept strut relative to the second wheel and the second aft swept strut about the longitudinal landing gear axis.

10. The landing gear system of claim 9, wherein each of the first and second aft swept struts acts as a spring that flexes to permit shifting of the first wheel and the second wheel relative to the mounting structure about a lateral landing gear axis transverse to the longitudinal landing gear axis.

11. The landing gear system of claim 8, comprising a pair of pins that extend orthogonally to the lateral tube bores, with a first of the pair of pins securing the end margin of the first aft swept strut to a first outboard margin of the center section and a second of the pair of pins securing the end margin of the second aft swept strut to a second outboard margin of the center section.

12. The landing gear of claim 1, wherein the mounting structure is attached to a fuselage of the aerial device.

13. A landing gear system for an aerial device, the landing gear system comprising:
   a first end of an independent center section received into a first trunnion mount and a second end of the independent center section received into a second trunnion mount, said first and second trunnion mounts being positioned on opposite sides of a longitudinal landing gear axis and configured to allow a pivotal attachment of the landing gear system to the aerial device; and
   a pair of aft swept struts
   comprising a first aft swept strut and a second aft swept strut, a first wheel mounted on the first aft swept strut and a second wheel mounted on the second aft swept strut,
   wherein the first aft swept strut is attached to the first trunnion mount and extends downwardly and rearwardly relative to the first trunnion mount, and the second aft swept strut is attached to the second trunnion mount and extends downwardly and rearwardly relative to the second trunnion mount, with each first and second aft swept struts and corresponding first and second wheels being pivotal with the trunnion mount to which it is attached.

14. The landing gear system of claim 13, wherein the first and second trunnion mounts each include a forward protruding boss and a rearward protruding boss configured to pivotally attach the respective trunnion mount to the aerial device, with the bosses of each trunnion mount of the pair of trunnion mounts defining a respective mount pivot axis and being arranged so that a first mount pivot axis, defined by the bosses of the first trunnion mount, and a second mount pivot axis, defined by the bosses of the second trunnion mount, are parallel to one another.

15. The landing gear system of claim 14, wherein each of the first and second aft swept struts acts as a spring that flexes to permit shifting of the first wheel and the second wheel relative to the corresponding trunnion mount about a lateral landing gear axis transverse to the mount pivot axis.

16. The landing gear system of claim 15, wherein the first and second trunnion mounts each presents a transverse bore, with each of the first and second aft swept struts having an end margin secured to a respective trunnion mount and received by a corresponding transverse bore.

17. The landing gear system of claim 16, comprising a pin that extends orthogonally to the transverse bore and secures the end margin of one of the first or second aft swept struts to the respective trunnion mount, said pin restricting movement of the end margin of the one of the first or second aft swept struts relative to the respective trunnion mount.

18. The landing gear of claim 13, wherein the first and second trunnion mounts are attached to a fuselage of the aerial device.

* * * * *